3,681,263
Patented Aug. 1, 1972

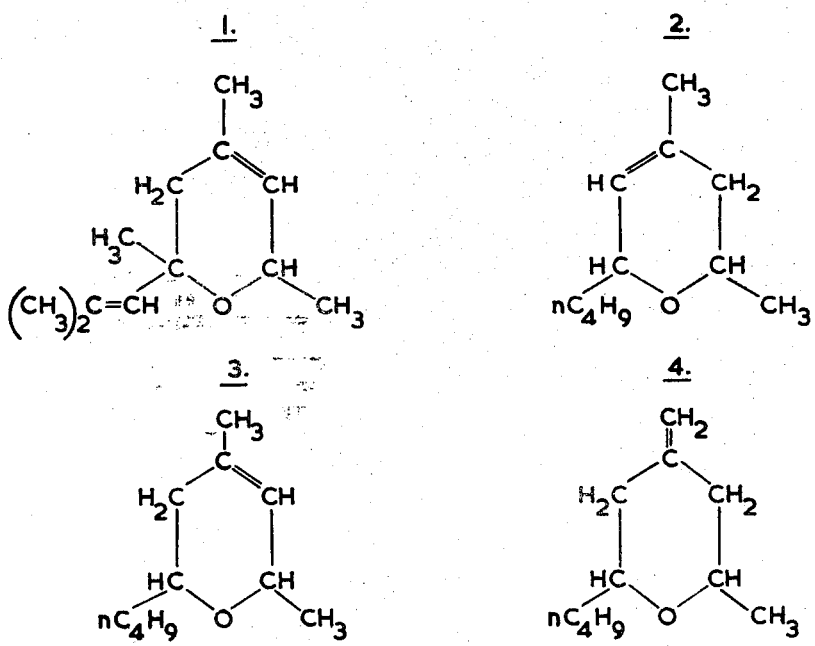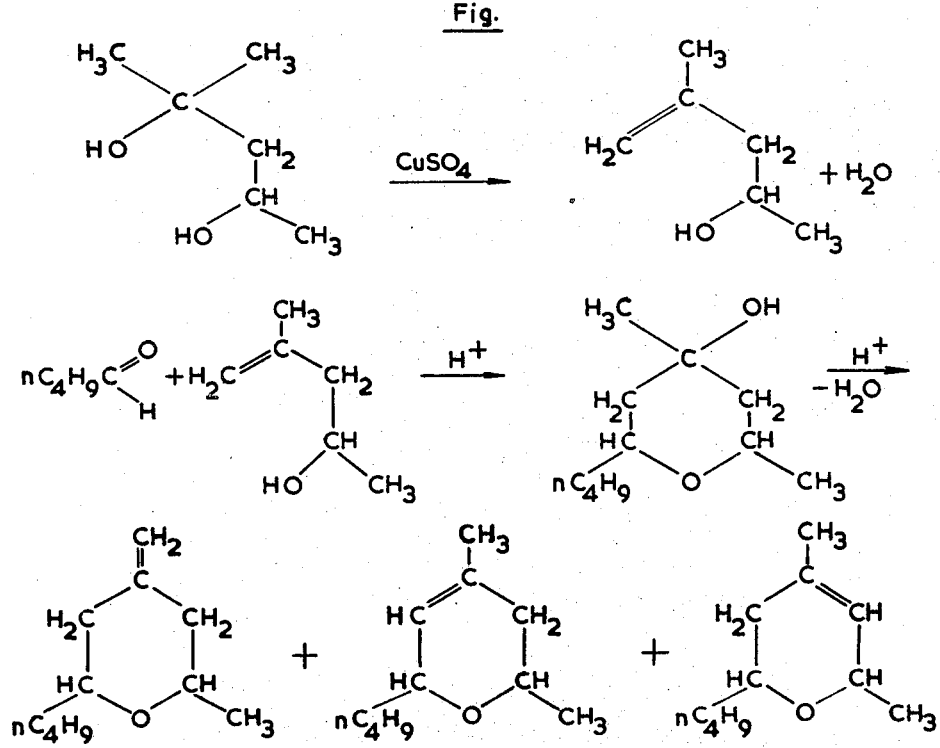

3,681,263
PROCESS FOR THE PREPARATION OF PER-
FUME COMPOSITIONS OR PERFUMED
ARTICLES RESPECTIVELY
Leendert Maarten van der Linde and Harmannus Boelens,
Huizen, Netherlands, assignors to N.V. Chemische
Fabriek "Naarden," Naarden, Netherlands
Filed Feb. 20, 1969, Ser. No. 801,005
Claims priority, application Netherlands, Feb. 23, 1968,
6802619
Int. Cl. C11b 9/00
U.S. Cl. 252—522                                    1 Claim

ABSTRACT OF THE DISCLOSURE

Perfume compositions, materials or articles comprising conventional constituents such as solvents, diluents and adjuvants and containing as an essential ingredient at least one compound selected from the group consisting of 2,4-dimethyl 6-n-butyl 2,3-dihydro-6H-pyran,
2,4-dimethyl 6-n-butyl 5,6-dihydro-2H-pyran, and
2-methyl-4-methylene 6-n-butyltetrahydropyran.

Also method of imparting desirable aroma to an object by applying thereto said perfume composition or material.

---

U.S. Pat. 3,309,276 corresponding to Dutch Application No. 6412168 discloses that a certain dihydropyran has an overpowering odor of roses with an underlying odor of geranium. The compound in question is the 6-(2-methyl-1-propenyl) 2,4,6-trimethyl 2H 5H dihydropyran of the Formula 1 shown in the drawing, as well as the corresponding isomeric compounds.

It also appears from the patent mentioned above that the odor useful in the perfumery is no common property of the dihydropyrans for it is said of the compound 6-isobutyl 2,4-dimethyl 5,6-dihydro 2H pyran that it may not be regarded as a perfume.

Surprisingly, it has now been found that pyran derivatives of the formulae 2, 3 and 4 shown in the drawing wherein the butyl group in the 6-position is a normal butyl group, are compounds having a strong odor which may be used to advantage in the production of perfume compositions and perfumed materials, as well as in the manufacture of perfumed articles.

The preparation of the novel compounds is carried out in the manner described in U.S. Pat. No. 2,452,977. The patent specification referred to does not mention anything about my perfume characteristics of the dihydro-pyrans prepared therein. Rather the compounds disclosed are said to be valuable as diluents, modifying agents, processing agents in the textile industry, and the higher members are valuable as solvents and may even serve as insecticides, fungicides and parasiticides.

The preparation of the pyrans used in this invention is effected in the following way:

Hexylene glycol is converted to 2-methyl-1-pentene-4-ol by heating under reflux in the presence of a catalytic amount of copper sulphate and azeotropic distillation. This 2-methyl-1-pentene-4-ol is allowed to stand together with p-toluenesulfonic acid and n-pentanal. The mixture is then distilled under reduced pressure. The distillate thus obtained contains all the three isomers, viz:

2,4-dimethyl 6-n-butyl 2,3-dihydro-6H-pyran,
2,4-dimethyl 6-n butyl 5,6-dihydro-2H-pyran, and
2-methyl-4-methylene 6-n-butyltetrahydropyran.

It may be used without separation into the separate isomers. The course of the reaction is illustrated in the figure of the drawing.

The product is a highly valuable perfume in the perfumery and it possesses a very penetrating sparkling green overtone, with a clear touch of geranium, and may be used in various compositions.

It provides a natural green touch in flower-like compositions, like geranium, rose, jasmin, hyacinth, lilac and violet. For flower-like compositions very small dosages of 0.1% to 0.5% will suffice, while dosages of 0.5% to 2% will supply a modern touch in compositions like fougère, chypre, tabac and other fancy types.

The following example illustrates the preparation of the pyran compounds 2, 3 and 4 of the drawing according to this invention.

EXAMPLE I 354 g. (3 mol) of hexylene glycol together with 0.1 g. of copper sulphate was heated under reflux in a distilling flask during 7 hours. After removal of the water formed by azeotropic distillation, the contents of the flask is fractionated. There is thus obtained 94 g. of 2-methyl-1-pentene-4-ol, boiling point 130-to 132° C., $n$ 20/D: 1.4313.

100 g. (1 mol) of this substance was shaken together with 86 g. (1 mol) of n-pentanal and 1 g. of p-toluenesulfonic acid until the acid has been dissolved. The mixture is then allowed to stand for about 64 hours at room temperature. After 200 g. of benzene has been added, the reaction mixture is washed with a 10% soda solution and then with water until the litmus reaction is neutral.

Benzene and first runnings are distilled under reduced pressure until the temperature of the liquid is about 80° C. at 27 mm. 5 g. of potassium-bi-sulphate is then added after which the distillation is continued and a fraction is retained boiling at 76 to 85° C. at 12 mm., $n$ 20/D: about 1.4472.

This fraction is again washed neutral with a 10% soda solution and fractionated. The desired product (78 g.) boils at 65 to 68° C. at 6 mm. and has the following physical constants:

$$d\ 20/20:\ 0.8585$$
$$n\ 20/D:\ 1.4477$$

The NMR spectrum indicates that the resulting product consists of the three isomers of the formulae 2, 3 (multiplet at

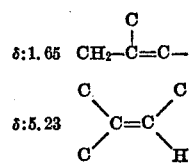

and 4 (multiplet at

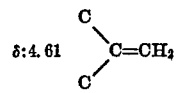

solvent CCl$_4$.

The following examples illustrate compositions prepared according to this invention using the pyran product of Example I.

EXAMPLE II

Geranium oil composition

| | G. |
|---|---|
| The product obtained by the process of Example I | 100 |
| Dimethyl sulfide—1% in geraniol | 40 |
| Isomenthone | 30 |
| Geraniol | 450 |
| Nerol | 50 |
| Citronellol | 250 |
| Linalool | 10 |
| Eugenol—10% in geraniol | 30 |
| Citral—10% in geraniol | 20 |
| Isopulegol—10% in geraniol | 20 |
| | 1000 |

EXAMPLE III

Rose geranium composition

| | G. |
|---|---|
| Benzyl-isoeugenol | 15 |
| Musk ketone | 15 |
| 11-oxahexadecanolide | 10 |
| Dimethyl-benzyl-carbinyl acetate | 10 |
| Rhodinol | 50 |
| Sandle-wood oil O.I. | 50 |
| Patchouly oil | 40 |
| Methyljonon | 100 |
| Ylang-ylang oil | 30 |
| Linalyl acetate | 150 |
| Citronellol | 150 |
| Phenyl-ethanol | 200 |
| The product obtained by the process of Example I | 30 |
| | 850 |

EXAMPLE IV

Jasmin composition

| | G. |
|---|---|
| Methylcinnamate | 10 |
| Methylnaphthyl ketone | 20 |
| Heliotropin | 30 |
| Benzyl benzoate | 100 |
| Indole—1% in diethylphthalate | 20 |
| Aldehyde C14—10% in diethylphthalate | 40 |
| Benzyl acetate | 280 |
| Alpha-hexyl cinnamaldehyde | 480 |
| The product obtained by the process of Example 1 | 20 |
| | 1000 |

What is claimed is:
1. A perfume composition comprising conventional perfume constituents and, as an essential ingredient, from 0.1 to 2.0% by weight of an isomeric mixture of 2,4-dimethyl 6-n-butyl 2,3-dihydro-6H pyran, 2,4-dimethyl 6-n-butyl 5,6-dihydro-2H-pyran, and 2-methyl-4-methylene 6-n-butyltetrahydropyran, said mixture having a green overtone with a touch of geranium.

References Cited

UNITED STATES PATENTS

| 2,452,977 | 11/1948 | Williams | 260—345.1 |
| 3,030,384 | 4/1962 | Somerville | 252—522 |
| 3,166,575 | 1/1965 | Naves | 260—345.1 |
| 3,163,658 | 12/1964 | Eschinasi | 252—522 |

ALBERT T. MEYERS, Primary Examiner

F. E. WADDELL, Assistant Examiner